(12) United States Patent
Ratet et al.

(10) Patent No.: US 7,216,683 B2
(45) Date of Patent: May 15, 2007

(54) RUNFLAT DEVICE FOR A MOTOR VEHICLE, AND A MOUNTED ASSEMBLY INCORPORATING IT

(75) Inventors: Florence Ratet, Chalettte sur Loing (FR); Nicolas Menant, Plainsboro, NJ (US); Olivier Heuze, L'isle Adam (FR)

(73) Assignee: Hutchinson, Paris (FR)

( * ) Notice: Subject to any disclaimer, the term of this patent is extended or adjusted under 35 U.S.C. 154(b) by 86 days.

(21) Appl. No.: 10/953,765

(22) Filed: Sep. 30, 2004

(65) Prior Publication Data

US 2005/0126672 A1    Jun. 16, 2005

Related U.S. Application Data

(60) Provisional application No. 60/528,213, filed on Dec. 10, 2003.

(51) Int. Cl.
*B60C 17/00* (2006.01)
*B60C 17/04* (2006.01)

(52) U.S. Cl. .................. 152/516; 152/152; 152/520

(58) Field of Classification Search ............ 152/155, 152/331.1, 339.1, 333.1, 334.1, 340.1, 343.1, 152/344.1, 152, 158, 157, 516, 518, 520
See application file for complete search history.

(56) References Cited

U.S. PATENT DOCUMENTS

2001/0052379 A1 * 12/2001 Heuze et al. ............... 152/516

FOREIGN PATENT DOCUMENTS

| EP | A-1 153 769 | 11/2001 |
|---|---|---|
| GB | 2015439 | * 9/1979 |

* cited by examiner

*Primary Examiner*—Justin R. Fischer
(74) *Attorney, Agent, or Firm*—Clark & Brody

(57) ABSTRACT

The present invention concerns a runflat device for a tubeless mounted assembly for a motor vehicle and an assembly incorporating said device. A device of the invention comprises an asymmetrical one-piece type rim comprising a drop center with two lateral walls and a tire cover mounted on the rim, the device being designed to be mounted in the drop center and comprising:
 a support ring divided into independent ring sectors having two lateral faces; and
 an annular clamping belt adapted to be mounted on and to bear on a radially inner bearing zone of one lateral face of the ring to wedge each ring sector in the drop center;

and in which the device is such that the belt comprises means for exerting a lateral clamping force and a radial clamping force on the bearing zone so that said belt clamps said ring sectors against one of said lateral walls and against said drop center, bearing on the other lateral wall.

17 Claims, 4 Drawing Sheets

# RUNFLAT DEVICE FOR A MOTOR VEHICLE, AND A MOUNTED ASSEMBLY INCORPORATING IT

This application claims priority of U.S. Provisional Application Ser. No. 60/528,213, filed Dec. 10, 2003.

The present invention relates to a runflat device for a tubeless mounted assembly for a motor vehicle and to an assembly incorporating said device, allowing a large distance to be covered at a relatively high speed when the assembly is partially or completely deflated.

BACKGROUND OF THE INVENTION

With one-piece rims, known runflat devices are generally constituted by a support ring which is clamped around a wheel rim inside a tire. That ring is formed either as a single piece with relatively flexible sides which may be continuous, or it may be a split flexible piece (i.e. from which a slice has been removed), or it may be formed from at least two rigid pieces each in the form of a circular arc or sector.

In the past, in order to mount the split ring or ring sectors in a clamped configuration around the rim, a rigid assembly and clamping fastener was used between the two free ends of the split ring or between the facing ends of the ring sectors, for example a fastener of the nut-and-bolt type. However, experience has shown that such fasteners can constitute the weak link in runflat devices (fatigue phenomena, for example).

The Assignee's European patent document EP-A-1 153 769 proposes a runflat device that can overcome the problems caused by such assembly and clamping fasteners. That device comprises a support ring for mounting on an asymmetrical one-piece type wheel rim having a drop center and an axially inner rim flange and an axially out rim flange, said ring being produced in at least two independent sectors, each having radially inner and outer zones, and is such that each sector is fixed to the rim at its radially inner zone using a screw or a clamping belt which surrounds the outer lateral flanges of the ring sectors. More precisely, the radially inner zone of each ring sector terminates in an arcuate sole which is designed to bear against the bottom of the drop center and which is formed by two lateral flanges, an inner flange and an outer flange, the inner flange being received in a lateral groove defined by the drop center while the outer flange, which matches the profile of the drop center, cooperates with means for fixing the ring sector on the rim.

OBJECTS AND SUMMARY OF THE INVENTION

An object of the invention is to provide a runflat device for mounting in a drop center in an asymmetrical one-piece type wheel rim, which device comprises a support ring having two lateral faces and divided into independent ring sectors and a clamping belt designed to bear against a radially inner bearing zone of one of said lateral faces to wedge each ring sector in the drop center, said device optimizing radial wedging of said ring sectors in the drop center when running in the inflated condition (i.e. by limiting the "centrifuging" phenomenon of the ring by the centrifugal effect) and lateral wedging of the ring sectors in said drop center when running flat (i.e. as regards lateral forces).

To this end, a runflat device of the invention consists in said belt comprising rigid means adapted to exert a lateral and radial clamping force on said bearing zone of said ring sectors when said sectors and said belt are mounted coaxially and in juxtaposition against the two lateral walls of said drop center, so that said belt clamps said ring sectors against one of said lateral walls and against said drop center, bearing on the other lateral wall in so doing.

In the present description, the expressions "axially inner" and "axially outer" respectively refer to the sides of the wheel rim which are designed to face the interior and exterior of the motor vehicle after mounting a unit comprising said rim on a vehicle.

In accordance with a further feature of the invention, said belt may advantageously comprise at least two rigid clamping zones which are respectively designed to bear on said bearing zone and on said other lateral wall by circumferential tensioning of a flexible connecting zone which comprises said belt and which connects said clamping zones together.

Preferably, said clamping zones diverge from each other from said connecting zone which they extend laterally.

In an embodiment of the invention, said belt may advantageously comprise metal or plastic tapes with an axial section in the form of a "U" each having arms respectively formed by said clamping zones and a web comprised in said connecting zone. Said arms have a profile adapted to the lateral wall of the drop center and to the lateral face of the ring.

In an embodiment of the invention, each of said arms may advantageously terminate in an end section which forms an angle in the range 50° to 80° with said web.

In accordance with a further feature of the invention, said bearing zone may advantageously have a substantially tapered surface to optimize clamping of said ring sectors against said lateral wall.

In an embodiment of the invention, said belt may advantageously comprise rigid clamping sectors, each in the form of a circular arc, kept spaced apart by an annular flexible band on which said clamping sectors are fixed, said flexible band having two ends distant from each other which are connected together by a fastener means with which they are provided. Said fastener means is adapted to adjust the tension of the belt.

It should be noted that said belt is sufficiently torsionally flexible in its open position (i.e. before positioning said fastener means) for it to be mounted around the rim.

In accordance with a further feature of the invention, said ring can comprise a radially inner face designed for mounting on a bottom of said drop center and a radially outer face designed for supporting said tire cover when running flat which is connected to said radially inner face by said lateral faces, the ring bearing zone being radially outwardly and axially inclined towards the opposed lateral face of said ring.

In accordance with a further feature of the invention, the opposed lateral face of said ring can comprise a radially inner abutment zone which is radially outwardly and axially inclined towards said bearing zone, so that the axial section of said ring reduces radially outwardly in said bearing and abutment zones.

In accordance with a further feature of the invention, said lateral faces of said ring can advantageously extend radially outwardly from said bearing and abutment zones, being parallel then diverging from each other to endow said ring with a maximum axial section equal to that of said radially outer face.

In a variation of the invention, the lateral face of each ring sector on said abutment zone side comprises an arcuate lateral skirt which laterally extends said abutment zone and which is adapted for mounting on a support surface of said rim, said drop center being substantially flat in axial section.

In a further variation of the invention, said lateral face of at least one of said ring sectors, on said abutment zone side, is provided with a lateral projection adapted to cooperate locally in abutment with at least one notch formed in said rim, to prevent rotation of said ring sectors in the circumferential direction around said rim.

In accordance with a further feature of the invention, said ring is advantageously based on a rigid material such as a thermoplastic polymer (for example a polyamide 6 or polyamide 6.6), its radially outer face that supports said tire cover when running flat advantageously being rubber-based.

A tubeless mounted assembly in accordance with the invention comprises an asymmetrical one-piece type wheel rim including a drop center defined by an axially inner and an axially outer lateral wall connected together by a bottom, a tire cover mounted against axially inner and outer flanges of said rim and a runflat device as defined above mounted in said drop center and comprising:
- a support ring divided into independent sectors and having an axially inner face and an axially outer face, mounted on said drop center bottom bearing against said inner lateral wall; and,
- an annular clamping belt mounted to bear against a radially inner bearing zone of said outer face of the ring to wedge each ring sector in said drop center, and which is mounted against said outer lateral wall;

wherein said belt comprises said rigid means so that said belt clamps said ring sectors against said inner lateral wall and against said drop center, bearing simultaneously on said outer lateral wall of said drop center and said outer lateral wall of the ring, thereby exerting said lateral and radial clamping forces respectively.

In accordance with a further feature of the invention, said belt is mounted above a bottom of said drop center connecting said lateral walls together, being separated from said bottom by a circumferential radial clearance.

In accordance with a further feature of the invention, in which, in known manner, said rim comprises axially inner and outer rim seats respectively designed for receiving beads of the tire cover, each seat being axially defined by one of said flanges and optionally by an adjacent circumferential ridge, said axially outer lateral wall of said drop center extending axially and radially inwardly from said axially outer seat, said axially inner lateral wall of said drop center advantageously extending axially and radially inwardly, forming an undercut cooperating with a radially inner zone of said axially inner lateral face of the ring, to lock the ring on the rim.

In a variation of the invention, said device is such that said lateral face of each ring sector located on said abutment zone side comprises an arcuate lateral skirt which extends said abutment zone and which is mounted on the rim axially inwardly of said drop center, said drop center bottom being substantially flat in axial section, and the rim is also such that said axially inner lateral wall of said drop center extends axially and radially inwardly forming said undercut.

In a further variation of the invention, axially inwardly of said drop center, the rim includes one or more notches locally distributed on the circumference of the rim, said notch or notches cooperating locally by abutting respectively against said lateral projection or projections of said ring sector(s), to prevent the ring from rotating on said rim.

BRIEF DESCRIPTION OF THE DRAWINGS

Other characteristics, advantages and details of the present invention will become apparent on reading the following description of some embodiments of the invention, given purely by way of non-limiting illustration, said description being made with reference to the accompanying drawings, in which.

MORE DETAILED DESCRIPTION

Figure 1:
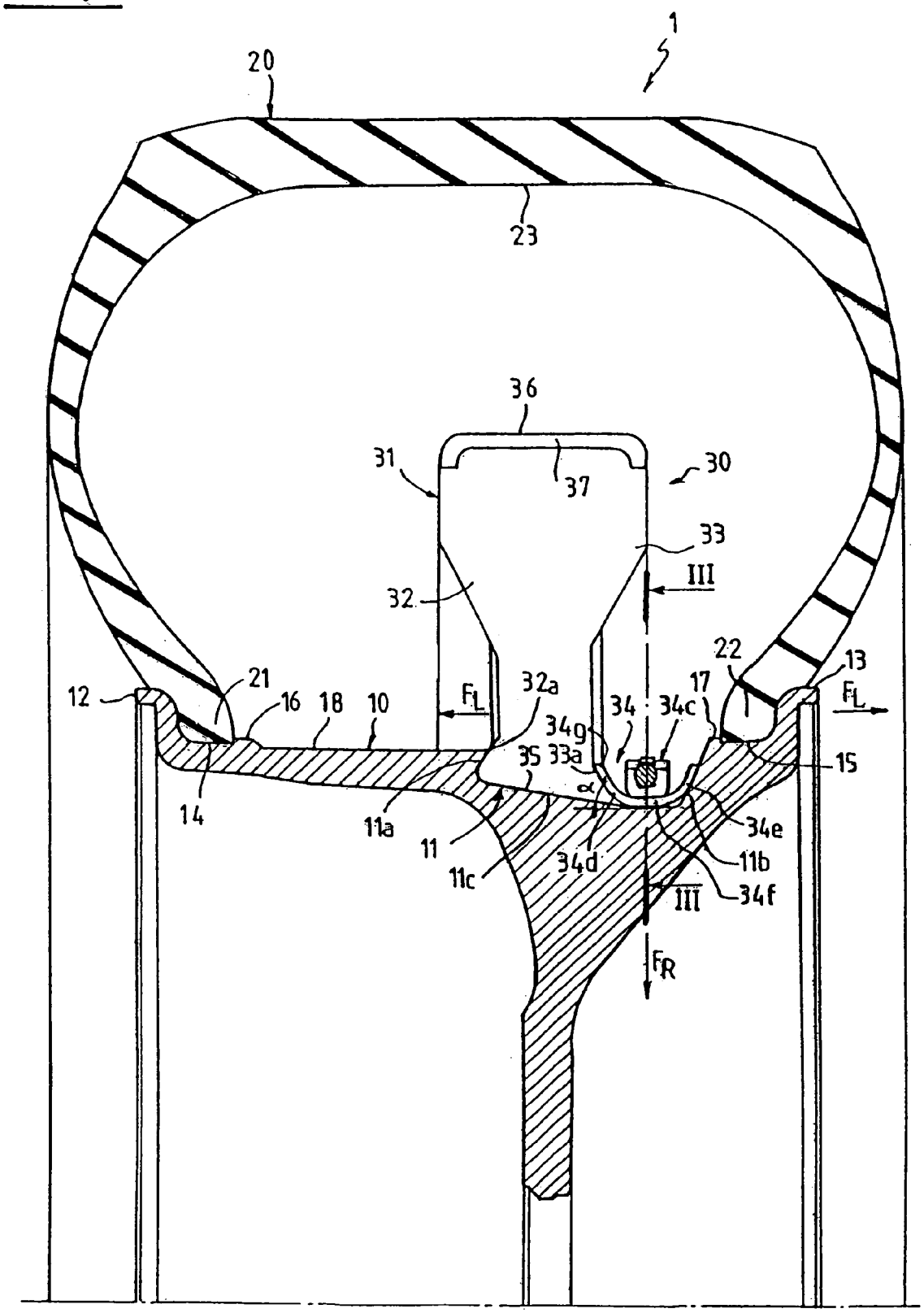
FIG. 1 is an axial half sectional view of an assembly incorporating a runflat device in accordance with the invention.

The assembly 1 shown in FIG. 1 comprises an asymmetrical one-piece wheel rim 10 comprising a circumferential drop center 11, a tire cover 20 mounted against the axially inner and outer flanges 12 and 13 of the rim 10, and a runflat device 30 mounted in the drop center 11 to support the tire cover 20 following a drop in inflation pressure inside the assembly 1.

The rim 10 comprises axially inner and outer rim seats 14 and 15 respectively designed to receive beads 21, 22 of the tire cover 20, each rim seat 14, 15 being axially defined by one of the flanges 12, 13 and by an adjacent circumferential ridge 16, 17.

The drop center 11 is advantageously provided adjacent to the axially outer rim seat 15, and is defined by an axially inner lateral wall 11a and an axially outer lateral wall 11b connected together by a bottom 11c, the axially outer lateral wall 11b extending axially and radially inwardly from the adjacent ridge 17.

The inner lateral wall 11a, with a radial depth that is less than that of the outer lateral wall 11b in the embodiment of FIG. 1, is connected to the axially inner ridge 16 via a substantially flat support surface 18. In accordance with the invention, this inner wall 11a extends radially inwardly by forming an undercut which is axially and radially inwardly inclined and which is designed to keep the sectors 31' and 31" in position under the various running stresses under inflated and runflat conditions.

The bottom 11c of the drop center 11 is slightly axially outwardly and radially inwardly inclined in the example shown in FIG. 1, and is adapted to receive the device 30 between the lateral walls 11a and 11b.

This device 30 comprises a support ring 31 divided into at least two independent sectors 31', 31" in the form of a circular arc (shown in FIGS. 2 and 3), the axially inner lateral face 32 of which is designed to be mounted against the axially inner wall 11a and the axially outer lateral face 33 of which is designed to be mounted against an annular clamping belt 34 which is itself designed to be mounted against the axially outer wall 11b.

The ring 31 comprises a radially inner face 35 designed to be mounted on the bottom 11c of the drop center 11 and a radially outer face 36 which is designed to support the tire cover 20 when running flat and which is connected to the radially inner face 35 via the two lateral faces 32 and 33. The ring 31 has a radially inner zone which is substantially designed to be comprised radially between the bottom 11c of the drop center 11 and the respective apices of its lateral walls 11a and 11b. This radially inner zone is defined firstly by a bearing zone 33a of the outer lateral face 33 designed to be mounted to bear against the belt 34 and by an abutment zone 32a of the inner lateral face 32 designed to be mounted against the lateral wall 11a of the drop center 11.

In accordance with the invention, the bearing zone 33a and the abutment zone 32a of each ring sector 31', 31" are each radially outwardly inclined and axially inclined one towards the other, so that they each have a substantially truncated conical surface and so that the axial section of said ring 31 reduces radially outwardly in the bearing zone 33a and abutment zone 32a.

The lateral faces 32 and 33 of each ring sector 31', 31" extend radially outwardly from the bearing zone 33a and abutment zone 32a respectively, being parallel then diverging from each other, and are again parallel up to the radially outer face 36, which has a maximum axial section.

Figure 2:
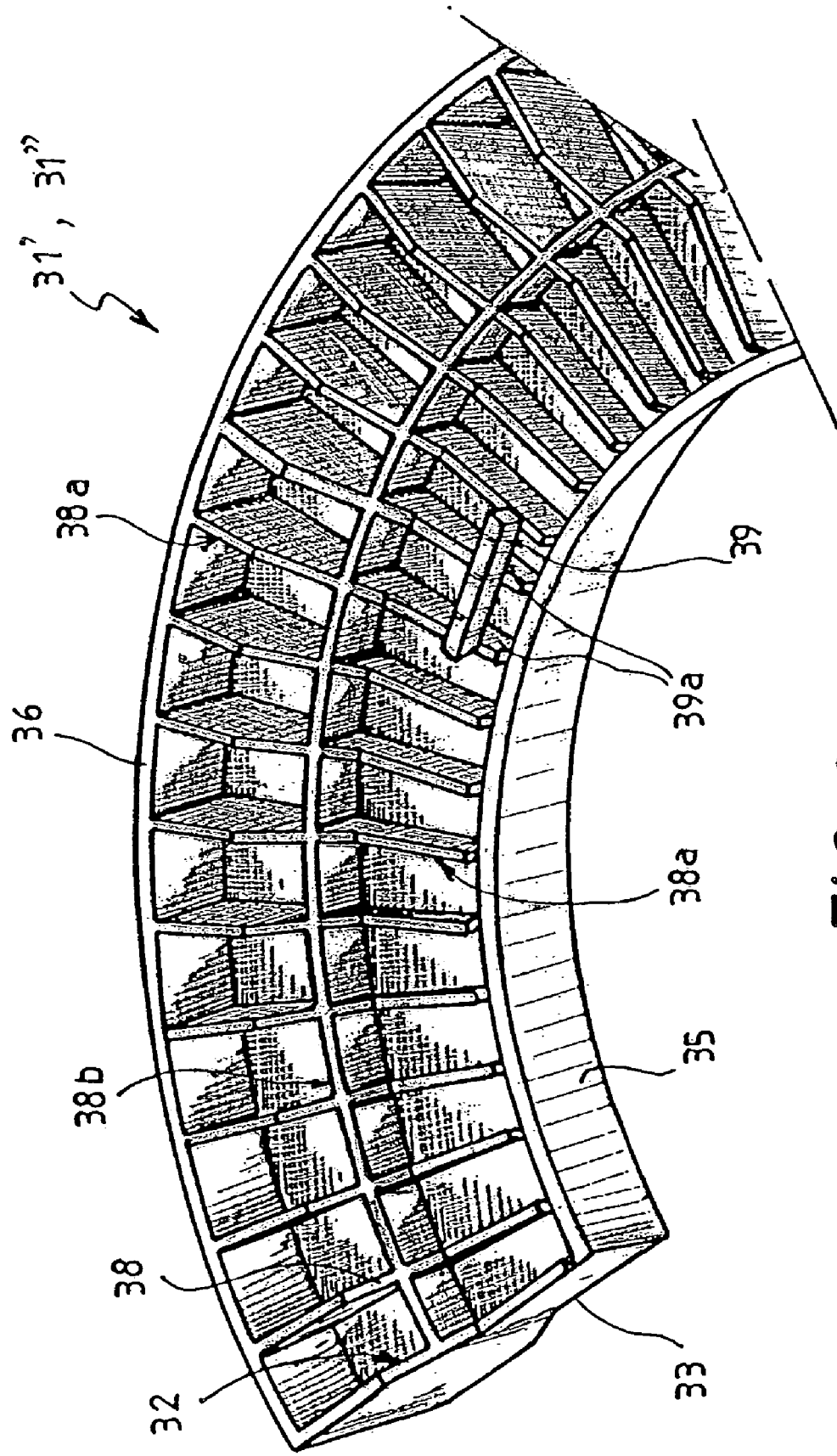
FIG. 2 is a partial perspective view of a ring sector for use in the runflat device of FIG. 1.
Figure 3:
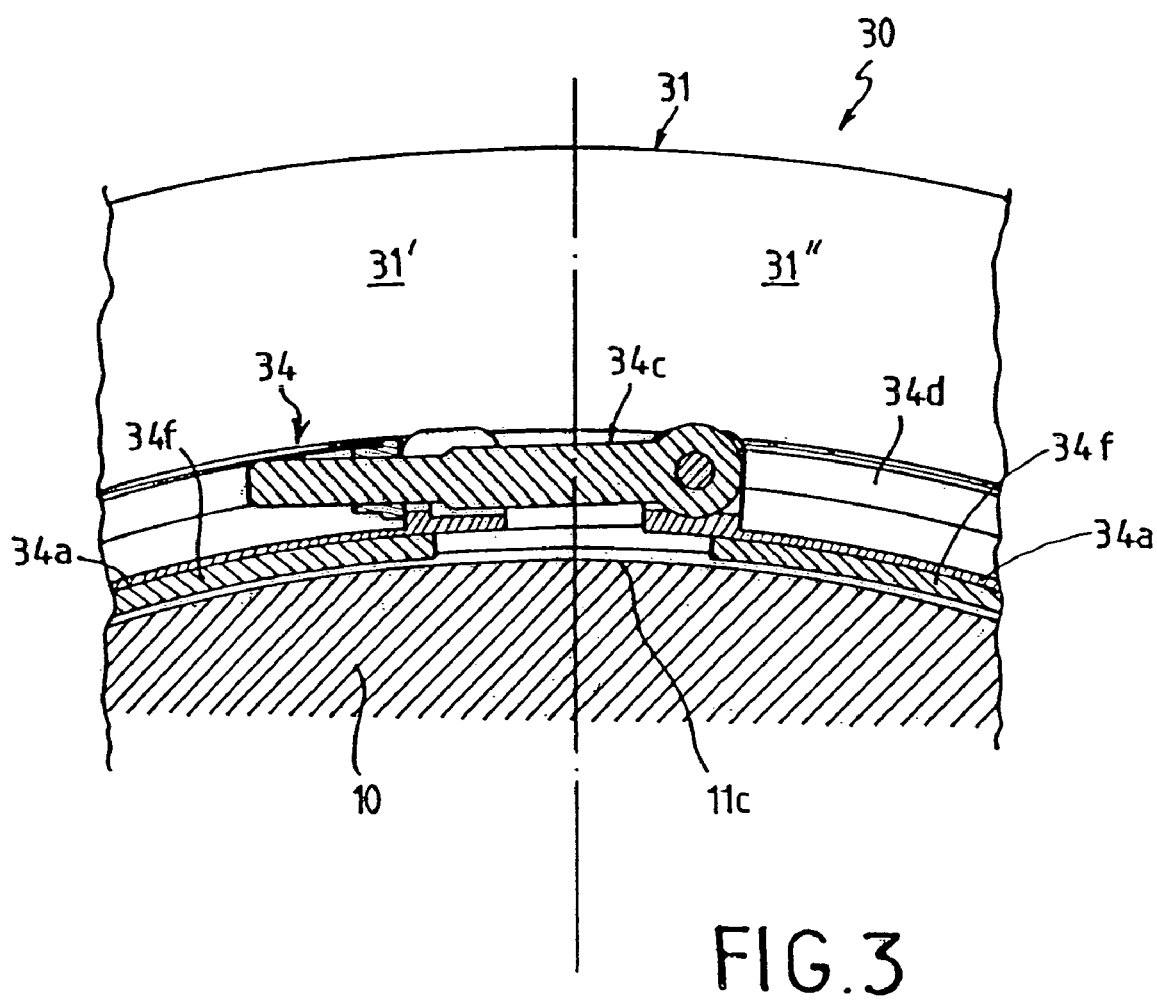
FIG. 3 is a sectional view of the assembly of FIG. 1 along the line III—III therein.

The ring sector 31' or 31" shown in FIG. 2 comprises a medial circumferential wall 38 in the form of a ring arc each side of which is provided with regularly spaced radial semi-partitions 38a which extend laterally from the radially inner face 35 to the radially outer face 36 of the sector 31', 31" so that their lateral edges define the lateral faces 32 and 33 of the ring sector 31', 31", and which are symmetrical with respect to the medial wall 38. Said radial semi-partitions 38a are connected together substantially at the radial mid-height of the two sides of the medial wall 38 by two circumferential half-partitions 38b which are also symmetrical with respect to said wall 38.

The lateral face 32 of at least one of the ring sectors 31', 31" which is located on said abutment zone 32a side (i.e. which is designed to constitute the axially inner face 32 of the ring sector 31', 31" when mounted on the rim), is provided with a lateral projection 39 in the form of a tab provided with tenons 39a on its lower face, which are adapted to cooperate locally in abutment with mortises formed in at least one notch (not shown) comprised in the rim, to prevent rotation of the ring sectors 31', 31" in the circumferential direction around the rim by constituting a "slew stop" for the ring 31.

It should be noted that several ring sectors 31', 31" or all of them could respectively be provided with such projections 39, using the same number of notches distributed regularly on the circumference of the rim.

Each ring sector 31', 31" is based on a rigid material (such as a polyamide 6) and its radially outer face 36 is advantageously provided with a covering 37 constituted by rubber in order not to wreck the tire cover in the event of flat running.

The belt 34 shown in FIG. 1 is adapted to be sufficiently torsionally flexible for mounting it on the rim 10 and it advantageously comprises rigid arcuate clamping sectors 34', 34" (visible in FIG. 3) spaced apart by a flexible band 34a which is open between its two ends 34b which are connected together by a fastener means 34c. Said clamping sectors 34', 34" provided for the flexible band 34a which is itself provided with the fastener means 34c are designed to be mounted on ring sector 31', 31" (the assembly constituted by the clamping sectors 34', 34", the flexible band 34a and the fastener means 34c forming a single piece).

In accordance with the invention, each clamping sector 34', 34" comprises rigid means adapted to exert a radial $F_R$ and a lateral clamping force $F_L$ (see FIG. 1) on the bearing zone 33a of the ring 31 and on the outer lateral wall 11b when the ring 31 and the belt 34 are respectively mounted in juxtaposition against the lateral walls 11a and 11b of the drop center 11, so that the belt 34 wedges each ring sector 31', 31" on the bottom 11c of the drop center 11 and against the inner lateral wall 11a.

Each clamping sector 34', 34" is advantageously constituted by a metal tape with an axial section in the form of an open "U" having two arms 34d and 34e which respectively form two rigid clamping zones designed to bear against the bearing zone 33a and on the outer wall 11b of the drop center 11, and a web 34f connecting the arms 34d and 34e together. Each arm 34d, 34e terminates in an end section 34g which is substantially truncated which together with the web 34f forms an angle α, for example of the order of 65°.

In accordance with the invention, the belt 34 is mounted on the rim 10 so that it is above the bottom 11c of the drop center 11, being separated from said bottom 11c by a radial circumferential clearance, so that the arms 34d and 34e can respectively freely exert the radial and lateral clamping forces $F_R$ and $F_L$ on the ring 31 via the inner arm 34d, and on the outer wall 11b via the outer arm 34e.

The belt 34 of the invention is, for example, obtained by forming metal or plastic tapes into the shape of a "U" forming the sectors 34', 34" then curving them into an arcuate shape, then by connecting said sectors by fixing them on the flexible band 34a (for example by spot welds) the ends 34b of which are then connected together by the fastener means 34c, which is known per se, of the nut-and-bolt type to endow the belt 34 finally obtained with improved torsional flexibility. The structure of said fastener means 34c is shown in more detail in FIG. 3, which in particular shows the gap between the two ends 34b of the belt 34 and the possible clamping of the ring sectors 31', 31" by tensioning the belt 34 obtained by screwing up the fastener means 34c.

Figure 4:
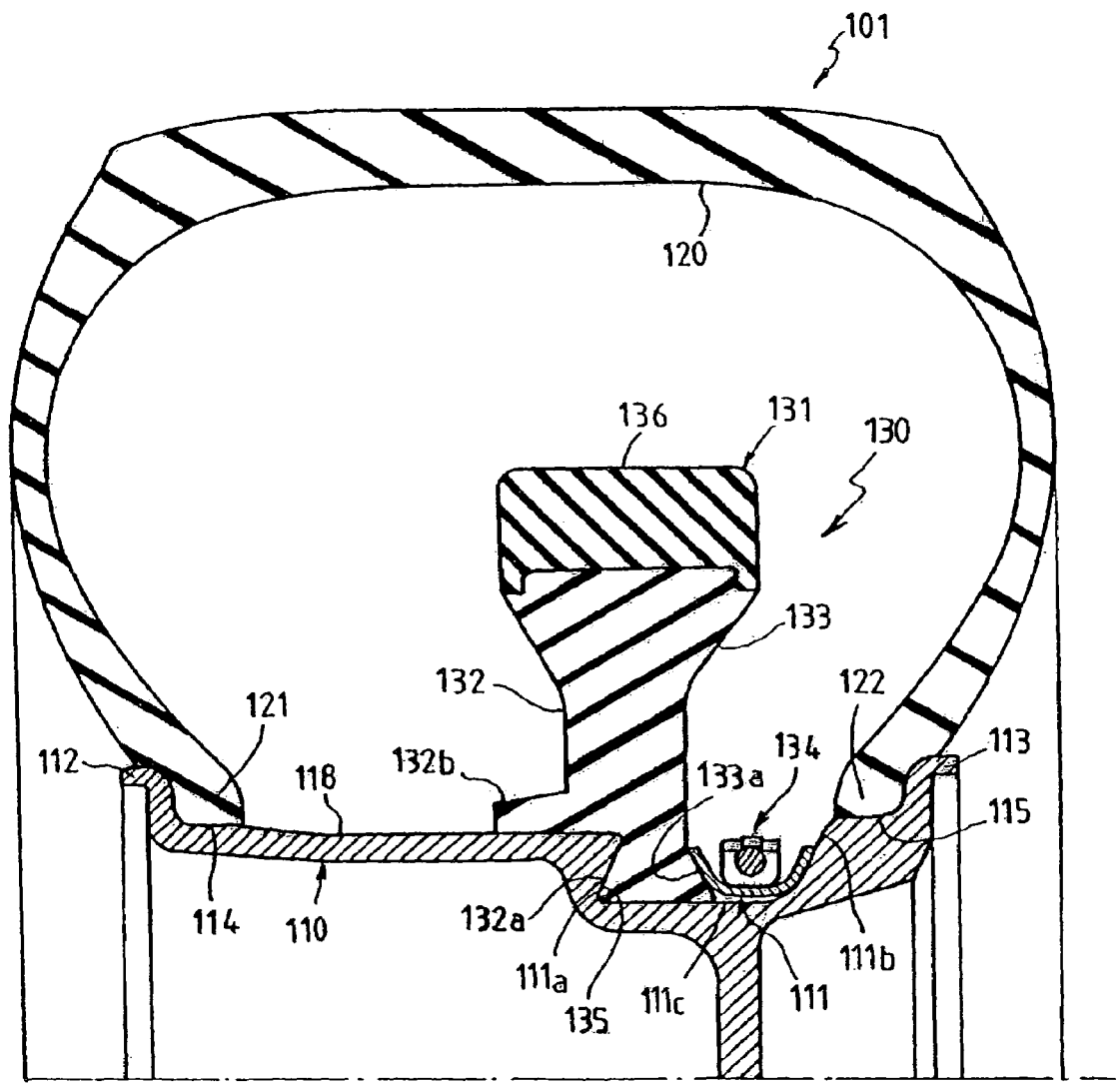
FIG. 4 is an axial sectional view of a variation in accordance with the invention of the assembly of FIG. 1.

The unit 101 shown in FIG. 4 essentially differs from that of FIG. 1 as follows:
 the lateral face 132 of each ring sector 131 which is located on the abutment zone side 132a comprises an arcuate lateral skirt 132b which extends the abutment zone 132a and which is adapted to match the profile of the rim support surface 118 axially inwardly of the drop center 111, and in that:
 the bottom 111c of the drop center 111 is substantially flat in axial section.

It should be noted that this lateral skirt 132b, which extends over the whole circumferential arc of each ring sector 131, can advantageously increase the contact surface area of the ring 131 on the rim 110 and the resistance of the runflat device to lateral movement, as well as "relieving" the belt 134 from transmitted forces by taking them up in part.

The runflat device 30 is essentially mounted in the tire cover 20 as follows.

Firstly, the tire cover 20 is partially mounted on the rim 10 by positioning the inner bead 21 of the tire cover 20 on the support surface 18 axially adjacent to the drop center 11, so that the outer bead 22 is axially outside the outer flange 13 of the rim 10, then a first ring sector 31' is inserted in the drop center 11 via the space created between the outer bead 22 and the outer flange 13, which is positioned against the inner lateral wall 11a of the drop center 11 and immobilizing the sector on said wall 11a. The other ring sector or sectors 31" is/are then inserted, and also positioned on the wall 11a. Then, the belt 34 is positioned in the drop center 11 in contact with the bearing zone 33a and the outer wall 11b. The clamping moment is then applied via the connection means 34c to exert said forces $F_R$ and $F_L$, which is possible because of the clearance between the bottom 34f of the belt 34 and the bottom 11c of the drop center 11.

A lubricating gel is then applied to the inner face 23 of the tire cover 20, before passing the outer bead 22 of the tire cover 20 over the rim flange 13. On inflating the tire cover 20, the inflation pressure presses the beads 21 and 22 onto their respective rim seats 14 and 15.

What is claimed is:

1. A runflat device for a tubeless mounted assembly for a motor vehicle, comprising an asymmetrical one-piece type wheel rim comprising a drop center defined by two lateral walls and a tire cover mounted on said rim, said device being designed to be mounted in said drop center to support said tire cover following a drop in inflation pressure inside said assembly, said device comprising:
    a support ring divided into independent ring sectors and having two lateral faces; and
    an annular clamping belt adapted to bear against a radially inner bearing zone of one of said lateral faces of the ring to wedge each ring sector in said drop center;
    wherein said belt comprises rigid means for exerting a lateral clamping force and a radial clamping force on said bearing zone of said ring sectors, when these ring sectors and said belt are coaxially mounted in juxtaposition against said lateral walls of said drop center, so that said belt clamps said ring sectors against one of said lateral walls and against said drop center, bearing on the other lateral wall;
    wherein said belt comprises at least two rigid clamping zones which are respectively designed to bear on said bearing zone and on said other lateral wall by circumferentially tensioning a flexible connecting zone comprised in said belt and which connects said clamping zones together.

2. A device according to claim 1, wherein said belt is divided into at least two clamping sectors connected via a flexible annular band on which said clamping sectors are fixed and which has two ends distant from each other and connected together via a fastener means adapted to adjust said tensioning.

3. A device according to claim 2, wherein said belt comprises metallic or plastic tapes with a "U" shaped axial section having arms respectively forming said clamping zones, said flexible connecting zone comprising said flexible band on which a web of each tape common to said arms is fixed, the ends of said flexible band being provided with said fastener means.

4. A device according to claim 2, wherein said clamping sectors are spot welded to said flexible band.

5. A device according to claim 1, wherein said bearing zone has a substantially truncated conical surface.

6. A device according to claim 3, wherein each of said arms terminates in an end section which forms an angle in the range 50° to 80° with said web.

7. A device according to claim 1, wherein said ring comprises a radially inner face designed to be mounted on a bottom of said drop center and a radially outer face designed to support said tire cover when running flat which is connected to said radially inner face by said lateral faces, said bearing zone of said ring being radially outwardly and axially inclined towards the opposed lateral face of said ring.

8. A device according to claim 7, wherein said opposed lateral face of said ring comprises a radially inner abutment zone which is radially outwardly and axially inclined towards said bearing zone so that the axial section of said ring reduces radially outwardly in said bearing zone and abutment zone.

9. A device according to claim 8, wherein said lateral faces of said ring extend radially outwardly from said bearing zone and abutment zone, being parallel then diverging from each other to endow said ring with a maximum axial section equal to that of said radially outer face.

10. A device according to claim 8, wherein said lateral face of each ring sector located on said abutment zone side comprises an arcuate lateral skirt which laterally extends said abutment zone and which is adapted to be mounted on a support surface of said rim, said drop center bottom being substantially flat in axial section.

11. A device according to claim 8, wherein said lateral face of at least one of said ring sectors located on said abutment zone side is provided with a lateral projection adapted to cooperate locally in abutment with at least one notch formed in said rim, to prevent rotation in the circumferential direction of said ring sectors around said rim.

12. A device according to claim 1, wherein said ring is based on a rigid material such as a thermoplastic polymer, its radially outer face designed to support said tire cover when running flat being rubber-based.

13. A tubeless mounted assembly for a motor vehicle, comprising an asymmetrical one-piece type wheel rim comprising a drop center defined by an axially inner lateral wall and an axially outer lateral wall connected together by a bottom, a tire cover mounted against the axially inner and outer flanges of said rim and a runflat device mounted in said drop center and designed to support said tire cover following a drop in inflation pressure inside said unit, said device comprising:
    a support ring divided into independent ring sectors and having an axially inner lateral face and an axially outer lateral face, said ring being mounted on said drop center bottom in abutment against said inner lateral wall; and
    an annular clamping belt mounted to bear coaxially on a radially inner bearing zone of said outer lateral face of the ring to wedge each ring sector in said drop center, and which is mounted against said outer lateral wall;
    wherein said belt comprises rigid means adapted for exerting a lateral clamping force and a radial clamping force on said bearing zone of said ring sectors so that said belt clamps said ring sectors against said lateral wall and against said drop center, bearing on said other lateral wall;
    wherein said belt comprises at least two rigid clamping zones which are respectively designed to bear on said bearing zone and on said other lateral wall by circumferentially tensioning a flexible connecting zone comprised in said belt and which connects said clamping zones together.

14. An assembly according to claim 13, wherein said belt is mounted above a bottom of said drop center connecting said lateral walls together, being separated from said bottom by a circumferential radial clearance.

15. An assembly according to claim 13, said rim comprising axially inner and outer rim seats respectively designed to receive beads of said tire cover, each rim seat terminating axially by one of said flanges, said axially outer lateral wall of said drop center extending radially and axially inwardly from said axially outer seat, wherein said axially inner lateral wall of said drop center extends axially and radially inwardly by forming an undercut cooperating with a radially inner zone of said axially inner lateral face of the ring, to lock said ring on said rim.

16. An assembly according to claim 15, wherein said lateral face of each ring sector located on said abutment zone side comprises an arcuate lateral skirt which extends said abutment zone and which is mounted on said rim axially inwardly of said drop center, said bottom of said drop center being substantially flat in axial section.

17. An assembly according to claim 13, said rim comprising axially inner and outer rim seats respectively designed to receive beads of said tire cover, each rim seat terminating axially by one of said flanges, said axially outer lateral wall of said drop center extending axially and radially inwardly from said axially outer seat, wherein said device is as defined in claim 11 and wherein said rim includes one or more notches axially inwardly of said drop center locally distributed on the circumference of said rim, said or each notch locally cooperating in abutment with said lateral projection of at least one of said ring sectors to prevent the ring from rotating on said drop center.

* * * * *